Figure 1:
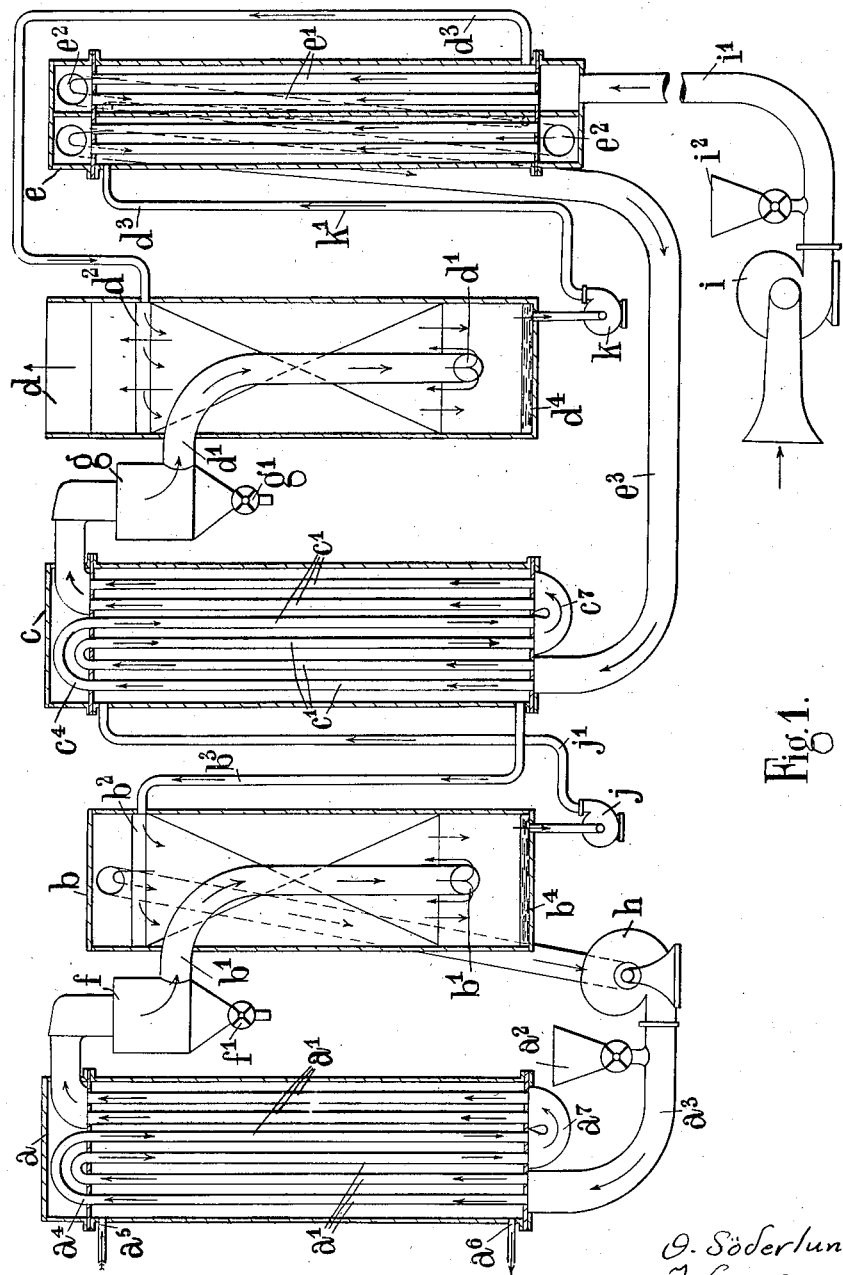

Patented Apr. 22, 1930

1,755,373

UNITED STATES PATENT OFFICE

OLOF SÖDERLUND AND THOMAS GRAM, OF LONDON, ENGLAND, ASSIGNORS TO TECHNO-CHEMICAL LABORATORIES, LIMITED, OF LONDON, ENGLAND

DRYING

Application filed April 23, 1928, Serial No. 272,264, and in Great Britain April 23, 1927.

This invention relates to the drying of material in the presence of a vapour carrying gaseous medium, such as air, and transmitting through partition surfaces the heat of the evolved vapour of a higher temperature stage of the drying to act as the supply of heat in a lower temperature stage.

The vapour-laden gaseous medium from a drier does not transfer its heat to a partition or the like with the same ease as liquids and their vapours, such as water and steam, and as the temperature at which vapours from drying can give up their heat of evaporation can never exceed the boiling temperature of the liquid from which they are evolved at the pressure employed and such temperature must suffice for producing the necessary heat transfer for one or more drying operations at temperatures above normal, the question of facilitating heat transfer increases in importance when reutilizing vapour-laden medium. The desirability of employing heating surfaces as small as possible also calls for great care in apportioning the temperature differences thus available while in addition the vapour-laden gaseous medium from a drying operation will often contain dust which will be deposited on the heating surfaces and impede their action.

The object of the present invention is to provide an improved method of utilizing the vapours evolved by drying in the presence of a gaseous carrying medium for further drying operations.

The invention consists in a method of utilizing the vapour-laden gaseous medium of a drying process to effect further drying by heat transmission through partition surfaces according to which the heat of the vapour is extracted with small temperature difference by direct contact with freely exposed liquid which subsequently heats the partition surfaces.

The invention further consists in the combination with a method according to the preceding paragraph of the feature of employing the vapour carrying medium for also carrying the material to be dried which material is separated therefrom prior to contact with the liquid.

The invention further consists in a method according to either of the preceding paragraphs in which any dust remaining in the vapour-laden gaseous medium after the separation of the material is removed through contact with a liquid, such as water, before or during the condensation of the vapours for obtaining heat therefrom.

The invention further consists in a method according to any of the preceding paragraphs in which the gaseous carrying medium is continuously circulated and successively brought into contact first with heated partition surfaces and then with circulating streams of a liquid which subsequently heats other partitions.

The invention further consists in a drying process in which the temperature difference required for transferring the heat of vapours carried from a drying operation by an incondensable gas to partitions is reduced by employing an intermediate liquid medium, such as water, which can absorb heat from the vapours with small temperature differences and which can heat partitions effectively with very small temperature differences, any dust which may be contained in the vapours being trapped by contact with liquid.

The invention further consists in apparatus operating in the manner indicated in any of the preceding paragraphs and having a number of drying systems employing heat-transferring partitions, a number of heat-exchanging systems, means for moving the material to be dried and vapour-absorbing gaseous media in the vicinity of said partitions, means for moving heating fluids, which in all but one of the systems are liquids, upon the other sides of said partitions, and means for heating said liquids in the heat-exchanging systems by direct contact with the vapour-laden gaseous media from a previous drying system.

The invention further consists in apparatus in accordance with the preceding paragraph in which the heat-transferring partitions constitute the walls of conduits having an extended perimeter in relation to their cross-sectional area and the gaseous medium which also carries the material to be dried is fully charged therewith and spread laterally to extended form while moving in an upward direction.

The invention also consists in improvements in or relating to drying processes and in apparatus for carrying the same into effect as hereinafter described.

Referring now to the accompanying drawings which show in a more or less diagrammatic manner apparatus for carrying the invention into effect:—

Figure 2:
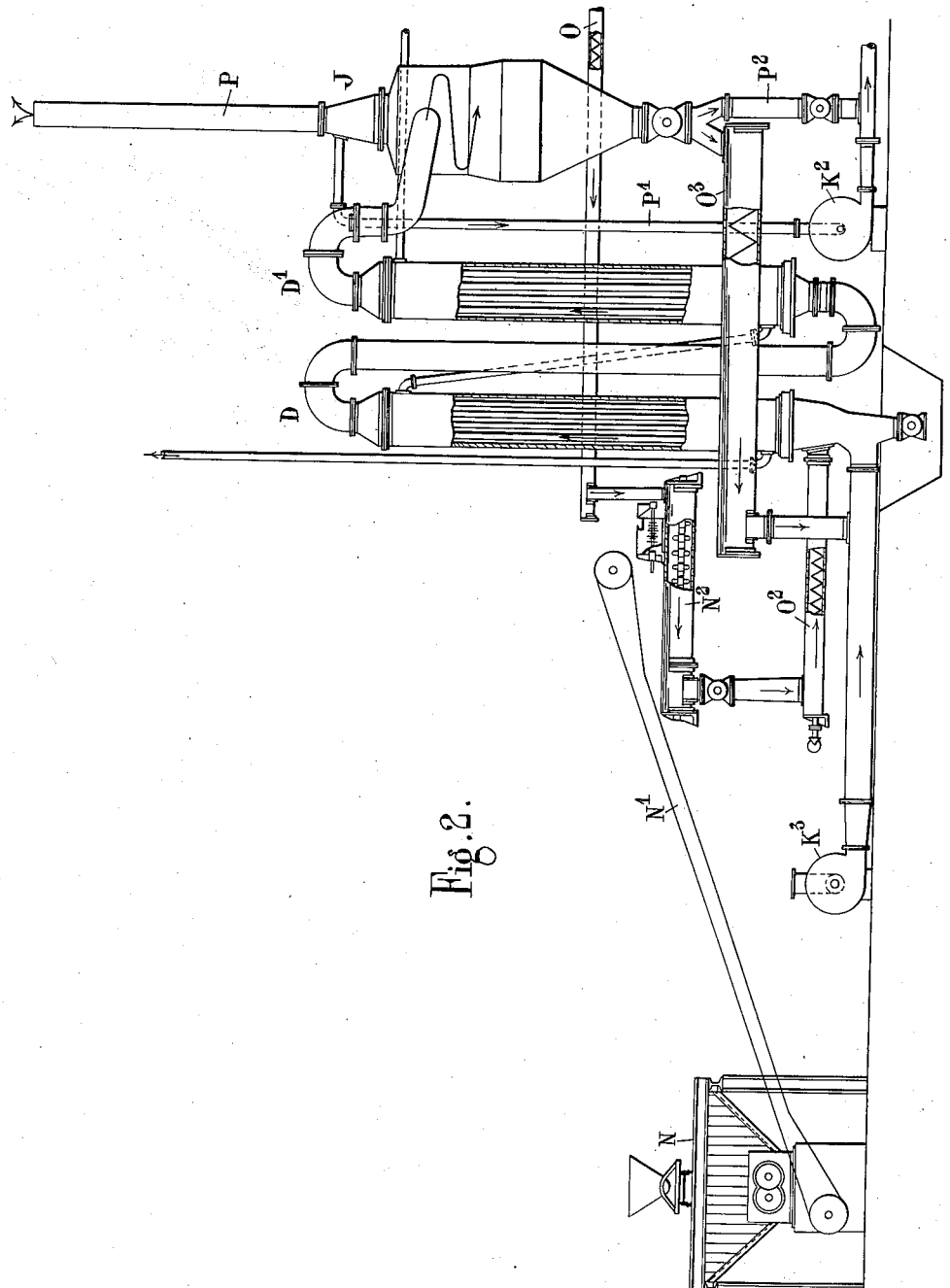
Figure 3:
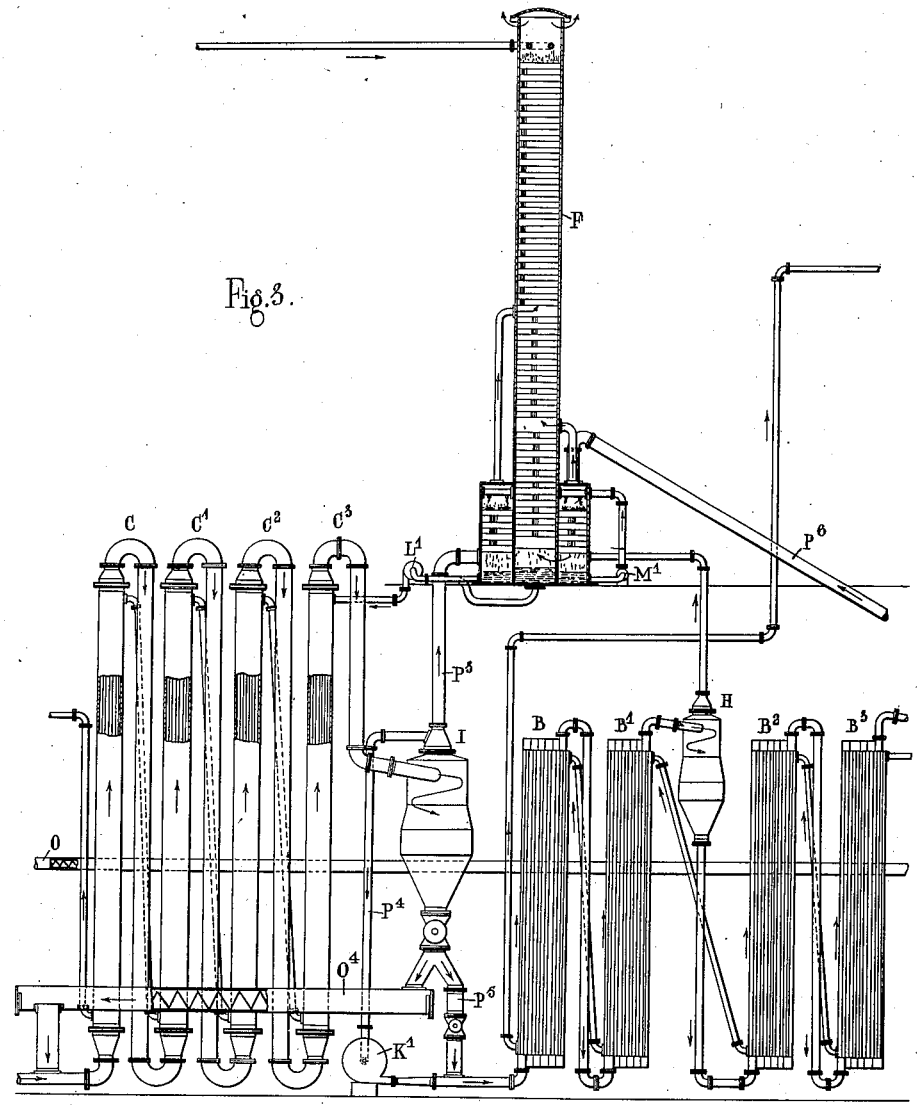
Figure 4:
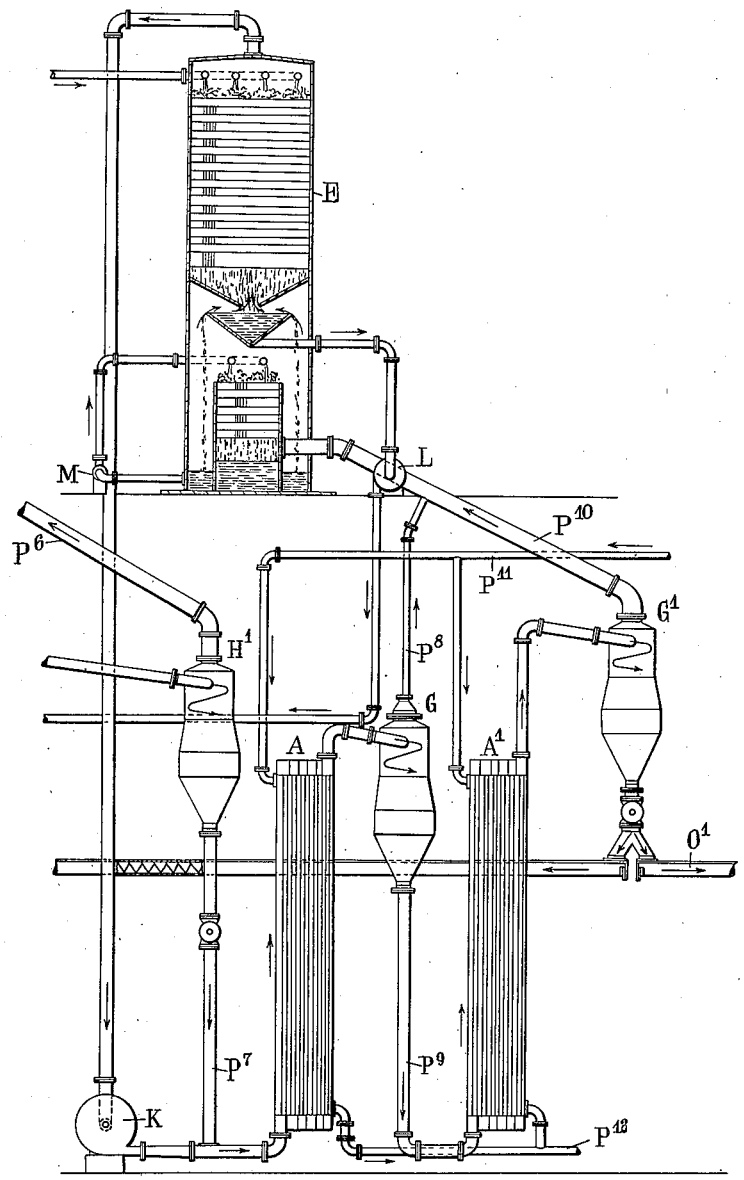

Figure 1 is a triple effect drier having three drying chambers and two heat-interchanging vessels, and Figures 2, 3 and 4 are an arrangement of a quadruple effect drying installation for dealing with peat.

When operating in accordance with this invention the heat contained in the vapours from a drier is used through heat-conducting partitions for effecting further drying. As, however, the vapour-laden gaseous medium in many cases may, due to incomplete separation, contain some dust which would be deposited on the partitions when the vapours are condensed thereon and as the rate of heat transmission between the vapour-laden gaseous fluid and the partition is relatively low, it is advantageous in such ways of carrying out the invention to transfer the heat of the vapour to a liquid such as water and use this as a heating medium for effecting further drying.

In the convenient way of carrying the invention into effect last indicated and shown in Figure 1 as applied by way of example only to the drying of moist disintegrated or granular material, the complete process is carried out in a series of five more or less closed vessels or chambers $a$, $b$, $c$, $d$ and $e$ three of which $a$, $c$ and $e$ are fitted with internal tubes or conduits $a'$, $c'$ or $e'$ the cross sections of which have an extended perimeter in relation to the area and the walls of which constitute heat-transmitting partitions. The other two vessels $b$ and $d$ are employed as heat exchangers in which the circulating gaseous medium entering by the pipes $b'$, $d'$ delivers up its heat and the heat of the vapour which it contains by direct contact with a divided liquid circulating through the chamber from the distributing trays $b^2$, $d^2$ fed by the pipes $b^3$, $d^3$. In addition to the five above-mentioned chambers, two cyclone extractors $f$, $g$ and two circulating fans $h$, $i$ together with two water-circulating pumps $j$, $k$ are employed.

The drying chambers $a$, $c$ and $e$ operate at successively lower temperatures and may be termed, respectively, $a$ the first, $c$ the second and $e$ the third, this designation being in accordance with the temperature employed therein or rather the order in which the heat passes from one to the other. The heat exchangers $b$ and $d$ also operate at different temperatures and may be termed the first and second heat exchangers in accordance with their working temperatures or order.

The drying chamber $a$ and the heat exchanger $b$ together with the cyclone $f$ and the circulating fan $h$ co-operate together for the circulation of a body of gaseous medium, such as air, which is employed continuously, the disintegrated material being fed into the stream at the hopper $a^2$ in the pipe $a^3$ by which the air enters the drier and being extracted from the air by the cyclone $f$ at the outlet of the drier and from which the dried material is discharged at $f'$. The stream of gaseous medium is driven through the drier $a$ and cyclone $f$ by the circulating fan $h$ and delivered from the cyclone by the pipe $b'$ to the bottom of the heat exchanger $b$ in which it rises in contact with a large superficial area of surface which is kept wetted by liquid passing from the tray $b^2$ at the top of the well $b^4$ at the bottom of the heat exchanger $b$ for the purpose of absorbing the heat of the gaseous medium and of the vapours driven off from the material to be dried and carried by the gaseous medium. The drier $a$ consists of a container through which pass three sets of tubes $a'$ connected by continuous separate bends $a^4$ at the top ends and a common connector $a^7$ at the bottom, making several passages rising from the bottom, where the fully charged gaseous medium from the pipe $a^3$ is spread laterally to extended form, to the top, returning to the bottom and rising to the top again, the space surrounding the tubes being filled with steam which enters by the pipe $a^5$ and is condensed and leaves the bottom of the casing by the pipe $a^6$ in the form of a condensate.

The drying chamber $c$ is of similar construction to the chamber $a$ and is in like manner provided with tubes $c'$ and separate top bends $c^4$ and a common connector $c^7$ at the bottom. This drier co-operates with the heat exchanger $d$ and is fitted in the same manner as the first drier $a$ with the cyclone extractor $g$ for the dried material which is discharged at $g'$. The circulating fan $i$ drives the current of gaseous medium through the pipe $i'$ provided with the feed hopper $i^2$ and then up in divided streams through the tubes $e'$ and down through the common tubes $e^2$ of the third drier $e$ and along pipe $e^3$ by which it passes into the drier $c$ and travels in a manner already described from the bottom to the top and then down again and up into the cyclone $g$ whence it is discharged through the second heat exchanger $d$ into the bottom of which it is delivered and from the top of which it escapes.

It will be seen that instead of employing a constantly circulating volume of gaseous medium, the second drier $c$ is continually operating on a fresh supply of such medium, the supply being drawn in from the atmosphere, driven through the third drier $e$ and being discharged to waste from the top of the second heat exchanger $d$. The second heat exchanger is similar in construction to the already described first heat exchanger $b$ and the third drier $e$ is as shown of a convenient construction of tubes $e'$ surrounded by jackets or casings arranged so that the gaseous fluid flows always in an upward direction through the drying tubes in order that counter-current may be employed for the heat transference.

The heating medium for the second and third driers $c$ and $e$ consists for the drier $c$ of the liquid employed in the first heat exchanger $b$ and for the third drier of the liquid employed in the second heat exchanger $d$, the said liquid in each case filling the whole of the container space between the conduit tubes and the exterior wall of the drier and being pumped by the pumps $j$ and $k$ respectively through the pipes $j'$ and $k'$ from the wells $b^4$ and $d^4$ in the bottoms of the heat exchangers in each case to the tops of the casings of the driers $c$ and $e$ and returning by the pipes $b^3$ and $d^3$ from the bottom of the driers $c$ and $e$ to the tops of the heat exchangers $b$ and $d$. From the top of one drier casing to the top of the other a balance pipe, not shown in the drawing, may be taken so that all excess of liquid obtained from condensation of the vapour driven off from the material undergoing treatment is finally discharged from the bottom of the third drier $e$.

The material to be dried is fed in disintegrated or divided form from the hopper $i^2$ into the current of air constantly driven into the third drier $e$ and, being uniformly distributed among the plurality of comparatively long and small cross-section tubes $e'$ due to division occurring always at the bottoms of upwardly directed tubes, passes through the third drier $e$ and with similar provisions through the second drier $c$ and after this uniform drying treatment is then extracted by the cyclone $g$ at the exit of the second drier. The material may be in succession carried through all the driers or independent material may be used in the two drying operations carried out in the process.

As an indication of the method of working, air may be driven into the third drier $e$ at a temperature of, say, 20° C. and pass therefrom at a temperature of 50° C. into the bottom of the second drier $c$ where its temperature is raised to about 75° C. This air will be discharged into the bottom of the second heat exchanger $d$ and, after passing therethrough and delivering its heat and the heat of the vapour which it carries to the liquid, will escape from the top of the said heat exchanger $d$ at a temperature of about 55° C. In the first drier $a$ and first heat exchanger $b$ very slight temperature differences are employed, the circulating air entering the bottom of the heat exchanger at a temperature of, say, 97° C. and leaving the top of the heat exchanger to enter the drier at a temperature of 95° C. The steam employed in the casing of the first drier may conveniently have a temperature of 130° C.

The liquid employed in the first heat exchanger $b$ may enter the top thereof at a temperature of 90° C. at which it leaves the bottom of the second drier and the said liquid may be discharged from the bottom of the first heat exchanger at a temperature of 95° C. at which it enters the top of the second drier. As the temperature gradient in the second drier $c$ is therefore only some 5° C. a return tube arrangement is quite permissible therein without any sacrifice of efficiency.

In the second heat exchanger $d$ the liquid enters the top at a temperature of about 50° C. at which it leaves the bottom of the third drier $e$ and the said liquid leaves the bottom of the heat exchanger at a temperature of about 73° C. at which it enters the top of the third drier. This produces a considerably greater temperature gradient in the third drier $e$ and for this reason it is advisable to employ countercurrent in the third drier $e$ and carry the circulating gaseous medium through the heat exchange regions only in an upward direction. This can be arranged by a plurality of tubes as shown or by providing a sufficient surface for the close and uniform disposition of the material in any other desirable manner.

The volumes and temperatures of fluids passing through the drying and heat-exchanging systems will be influenced by the thermal properties of the heat-carrying fluids employed, for instance the main part of the heat contained in steam can be transferred to another body at constant pressure and temperature by condensation, whereas when cooling water, the fall in temperature is practically proportional to the amount of heat removed.

With a gaseous medium, such as air, however, when being maintained saturated with vapour, heat can only be given up when its temperature is lowered, the fall in temperature being not proportional to the heat given away due to the varying amounts of vapour condensed at different temperature regions. The same differences apply to the absorption of heat by the fluids mentioned under the conditions specified.

At temperatures not much below 100° C. a given weight of gaseous fluid when maintained saturated with vapour can give away or absorb large amounts of heat by condensation or evaporation with only slight changes of temperature and at this region of temperature the passage of heat in accordance with the principles employed in this invention can therefore be effected when employing moderate volumes of gaseous fluid, with small changes in the temperature, the thermal properties of the fluids being at this region not very different from those of steam. As the changes in temperature are small compared with the temperature difference employed for the heat transfer, countercurrent is not necessary at this temperature region but the fluid should preferably be circulating.

At lower temperatures, however, larger variations in the temperature of the heat-carrying vapour-laden gaseous fluid are necessary for transferring the heat and vapour and it is therefore advantageous to make the fluid absorb heat and vapour continuously at successively higher temperatures during the drying and subsequently cause the fluid to give up heat and vapour by condensation at successively lower temperatures. In this case counterflow is advantageous.

As the heat-carrying capacity of the vapour-laden gaseous fluid and consequently the rate of change in the temperature when heat is transferred at a given rate varies considerably, it may be advantageous to employ a larger weight of gaseous medium at lower temperature than at a higher. This can be arranged by the use of suitable tappings or intermediate connecting ports between the vessels or chambers, for instance as described more fully in connection with the interchange of heat between liquids in British patent specification No. 251,344.

In the arrangement shown by way of example in Figures 2, 3 and 4, $A$, $A'$ represent the first effect driers and $B$, $B'$, $B^2$, $B^3$ the second effect. $C$, $C'$, $C^2$ and $C^3$ represent the third effect and $D$, $D'$ the fourth effect. $E$ is the first heat interchanger in which the liquid for the second effect is heated and $F$ is the second heat interchanger in which liquid is heated in stages for the third and fourth effects, the liquid being circulated by the pumps $L$ and $L'$ respectively in the two interchangers and each being fitted with scrubbing apparatus in which liquid is circulated by the pumps $M$, $M'$ respectively.

$G$, $G'$, $H$, $H'$, $I$ and $J$ represent cyclones operating respectively with the first, second, third and fourth effects while the gaseous carrying medium is delivered to these effects respectively by the fans $K$, $K'$, $K^2$ and $K^3$.

The raw peat is delivered to the macerator $N$ and passes by the conveyor $N'$ to the mixer $N^2$ where to facilitate its transport by a gaseous medium it is mixed with the necessary proportion of treated peat travelling by the conveyor $O$ from the cyclone $G'$, the remainder of the treated peat passing from this cyclone to a store or other location by the conveyor $O'$.

Peat from the mixer $N^2$ travels by the conveyor $O^2$ into the stream of air from the fan $K^3$ which carries it through the fourth effect driers and into the cyclone $J$, a large proportion of the vapour escaping at the pipe $P$ while a smaller portion travels by the pipe $P'$ to the fan $K^2$. The material in the cyclone $J$ is subjected to separation and goes in part by the conveyor $O^3$ for recirculation in the first effect and in part by the pipe $P^2$ into the stream of air delivered from the fan $K^2$ by which it is carried into the third effect driers.

The vapour from the third effect driers passes to the cyclone $I$ whence the vapour travels in part by the pipe $P^3$ to the scrubbers and heat interchanger $F$ while a small part passes by the pipe $P^4$ to the fan $K'$ for delivery to the second effect driers. The separated material from the cyclone $I$ is divided in the same manner as that from the cyclone $J$, part returning by the conveyor $O^4$ for recirculation in the third effect driers while the remainder passes by the pipe $P^5$ to the second effect driers in the stream of air delivered by the fan $K'$.

The air and material pass in series through the elements $B$, $B'$ of the second effect drier and then into the cyclone $H$ in which a partial separation is effected and a part of the vapour travels to the scrubbers and first heat interchanger $F$ while the remainder of the material-laden gaseous medium passes to the elements $B^2$, $B^3$ of the second drying effect. From $B^3$ the material and vapour-laden air pass to the cyclone $H'$ whence the air and vapour travel by the pipe $P^6$ to the scrubbers and heat interchanger $F$ while the separated material is discharged through the pipe $P^7$ into the stream of air drawn by the fan $K$ from the first heat interchanger $E$ and delivered into the first element $A$ of the first drying effect. From the first element $A$ the gaseous medium and material pass to the cyclone $G$ when a certain amount of the vapour is discharged by the pipe $P^8$ to the scrubber and heat interchanger $E$ while the separated material with the remainder of the vapour-laden air passes by the pipe $P^9$ to the element $A'$ of the first drying effect and is subsequently delivered to the cyclone $G'$ whence the vapour-laden air passes by the pipe $P^{10}$ to the scrubber and heat interchanger $E$, the separated material from the cyclone $G'$ being distributed as already described. The first effect driers $A$, $A'$ are heated by steam, from a convenient source such as a turbo generator or other power-generating device, which is delivered to them by the pipe $P^{11}$ and the condensate is returned by the pipe $P^{12}$ to a hot well.

The invention can with advantage be applied to the drying of a great variety of materials which are of moderate dimensions in one or more directions or have at least one small dimension including coal-dust, peat, lignite, brewers' grain and similar materials as well as sheet material, e. g. paper, fabrics or the like.

When drying certain materials, such as peat, lignite, grass, etc., where a large proportion of water has to be removed in comparison with the surface of the material, it is advantageous to circulate the material a number of times through the low temperature effects of the drier, so as to at all times expose large surfaces of the material in comparison with the volume of air employed as carrier and the adjacent heating surfaces. In the higher temperature effects the quantity of air required is relatively small and the drier conduits can therefore be made of great length so that a suitable ratio between surface exposed by the material and heating surface can be obtained without recirculation.

From the above it will be seen that when using driers, which can be worked economically with moderate or small temperature differences and where the amount of gas conveyed together with the vapours can be controlled as the drying proceeds and preferably in conjunction with a heat exchanger employing small temperature differences and cheap surfaces, the weight of water which can be removed from the materials to be dried is several times larger than the weight of steam consumed in the operations. It is consequently possible through this invention to obtain a very high thermal efficiency while employing a relatively simple and inexpensive apparatus.

The invention is in no way limited to the kind of apparatus described or material referred to or heating medium employed for the primary supply of heat to the apparatus. Incondensable carrier gases of any desirable kind may also be employed and modifications and additions may be introduced without departing from the spirit of the invention.

We claim:—

1. A method of treating moist material of at least one small dimension comprising bringing said material carried in suspension in a gaseous fluid current across heat-transmitting surfaces of attenuated conduits whereby moisture is evaporated from the material, separating the material from the current, extracting from the current by direct contact with a divided liquid the latent heat of the evaporation and employing the heat thus attained by the liquid to effect drying of other moist material.

2. A method of treating moist material comprising carrying said material in suspension in a gaseous fluid current across heat-transmitting surfaces of attenuated conduits whereby moisture is evaporated from the material, separating the material from the current, extracting from the current by direct contact with a divided liquid the latent heat of the evaporation, employing the liquid thus heated for heating partition surfaces and carrying further moist material in suspension in a gaseous fluid current against the other side of said heated surfaces to effect drying.

3. A method of treating moist material comprising bringing said material carried in suspension in a gaseous fluid current across heat-transmitting surfaces of attenuated conduits, separating the material from said current, bringing said current into direct contact with a finely divided liquid to which the latent heat of the vapour associated with the current is transferred with a very small temperature difference, circulating said heated liquid over partition surfaces to heat the same and bringing moist material carried in suspension in a current of gaseous fluid across the other side of said heated partition surfaces.

4. A method of treating moist material comprising carrying said material in suspension in a gaseous fluid current across heat-transmitting surfaces of attenuated conduits, separating the material from said current, bringing said current into direct contact with a finely divided liquid to which the latent heat of the vapour associated with the current is transferred with a very small temperature difference, circulating said heated liquid over partition surfaces to heat the same and carrying moist material in suspension in an attenuated current of gaseous fluid across the other side of said heated partition surfaces.

5. A method of removing moisture from material to be dried comprising carrying moist material through heated attenuated conduits while carried in suspension in a stream of non-condensable gaseous fluid, separating the drier material from said stream of fluid which is now charged with vapour formed from the moisture previously in the material, causing direct contact between said stream of fluid and a finely divided liquid, bringing the liquid heated by the latent heat of the condensed vapour into contact with one side of a heat-transmitting wall of an attenuated conduit and bringing moist material carried by a gaseous fluid into contact with the other side of said wall.

6. A method of treating moist material for reducing its liquid content, comprising adding material of at least one small dimension to a compact current of air, dividing said current among a plurality of small conduits so that while maintaining the total volume thereof all the suspended material passes in close relation to containing wall surfaces, exteriorly heating said surfaces, separating the air now charged with evolved vapour from said material, trickling water over said vapour charged air, using said water to heat the walls of other small conduits and conducting moist material suspended in air through said conduits to evolve vapour from the material by the heat derived from the liquid.

7. A method of treating moist material for reducing its liquid content, comprising adding said material to a current of gaseous medium flowing in bulk, attenuating said current so that while maintaining the total volume thereof all the suspended material passes in close relation to containing wall surfaces, exteriorly heating said surfaces, separating the gaseous medium now charged with vapour evolved from the moisture of the material from said material, bringing said vapour charged medium into direct contact with liquid to heat the same by condensing said vapour, using said liquid to heat the walls of attenuated conduits and conducting moist material suspended in gaseous medium through said conduits to evolve vapour from the material by the heat derived from the liquid.

8. A method of treating moist material for reducing its liquid content, comprising adding material of at least one small dimension to a compact current of air, dividing said current among a plurality of small conduits so that while maintaining the total volume thereof all the suspended material passes in close relation to containing wall surfaces, exteriorly heating said surfaces, separating the air now charged with evolved vapour from the moisture of the material from said material, trickling water over said vapour charged air, re-utilizing said air as above described, using said water to heat the walls of other small conduits and conducting moist material suspended in another current of air through said conduits to evolve vapour from the material by the heat derived from the liquid.

9. A method of treating moist material for reducing its liquid content, comprising adding material which is thin in at least one direction to a current of gaseous medium flowing in bulk, dividing said current after the addition among a plurality of small conduits so that while maintaining the total volume thereof all the suspended material passes in close relation to containing wall surfaces, exteriorly heating said surfaces, separating the gaseous medium now charged with evolved vapour from said material, trickling water over said vapour charged medium, using said water to heat the walls of other small conduits, conducting similar moist material suspended in gaseous medium through said conduits to evolve vapour from the material by the heat derived from the liquid and employing the heat of the last-mentioned vapour to effect further drying operations in stages at successively lower temperatures.

In testimony whereof we have signed our names to this specification.

OLOF SÖDERLUND.
THOMAS GRAM.